May 28, 1968  G. S. JEWELL  3,385,122

DRIVE MECHANISM

Filed Oct. 19, 1965

United States Patent Office 3,385,122
Patented May 28, 1968

3,385,122
DRIVE MECHANISM
George S. Jewell, Ancaster, Ontario, Canada, assignor to Canadian Westinghouse Company, Limited, Hamilton, Ontario, Canada, a company of Canada
Filed Oct. 19, 1965, Ser. No. 497,882
3 Claims. (Cl. 74—200)

ABSTRACT OF THE DISCLOSURE

In a line tracing machine, a friction wheel mechanism to provide a constant speed drive, comprising two friction wheels mounted on an axle which is fixedly tilted at a small angle relative to a driving surface which is a friction plate that rotates about a pivot point. One friction wheel is driven by the friction plate and each friction wheel is only in contact with one surface. The axle is allowed to rotate through any angle in the reference plane about the pivot point. The distance from the pivot point to the centre of each wheel being adjustable and set such that the mechanism provides a constant speed drive.

---

This invention relates to steerable, friction drive wheels, in particular those used in association with line tracing apparatus. In the past it has been known to control metal working machinery and in particular gas cutting torches by means of patterns. Sometimes these patterns are followed manually and in other arrangements there are provisions for automatically following the pattern.

One of the convenient modes of imparting motion to the equipment is to provided a constant speed drive from a source such as an electric motor which drives and rotates a friction drive wheel which engages a surface. The wheel may then be steered in such a manner that the torch follows the convolutions of the pattern.

With such an arrangement it would appear that the machine would be driven at a constant velocity determined by the speed of the motor drive. However, it will be appreciated by a closer examination of the situation that there must be, during the steering of the wheel, some additional rotational effect added or subtracted from the normal wheel speed depending upon the gearing used to couple the motor to the wheel.

A clearer understanding of this particular problem may be had from a consideration of U.S. Patent No. 2,461,585 issued Feb. 15, 1949, to N. E. Anderson.

The disadvantages caused by the variations in speed will be appreciated by those skilled in the art. It is particularly necessary for example that gas cutting torches be operated at a constant speed if it is desired to burn iron consistently and properly and to have a constant width of cut. The solution to the problem provided by the foregoing patent while suitable for some purposes requires a specific off-set for a given gear ratio which makes the solution relatively inflexible.

A simplified drive mechanism is proposed in accordance with my invention which not only arranges to compensate for changes in velocity which otherwise would be caused during steering but also provides a very simple type of drive mechanism which may be arranged to provide any desired relationship between the drive motor shaft speed and the drive wheel speed. Due to its arrangement this drive mechanism is extremely compact and of simple and economic construction.

A clearer understanding of my invention may be had from the following specification and drawings in which.

Figure 2:
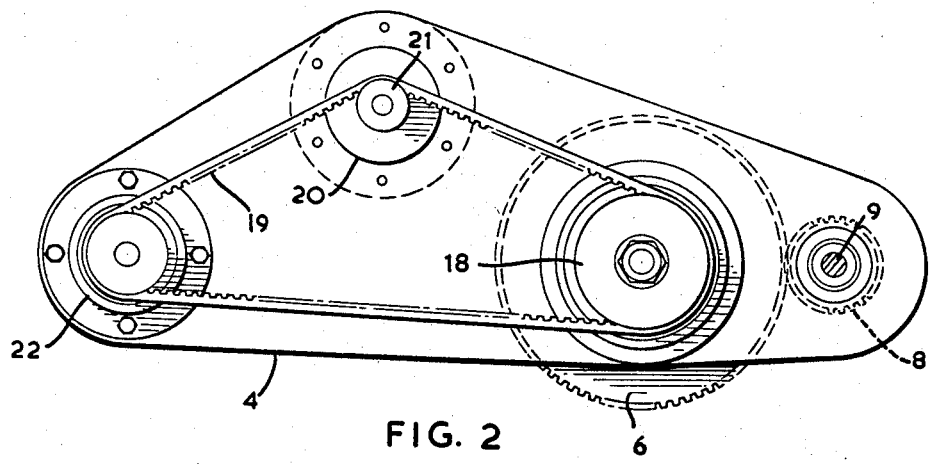
FIGURE 2 is a plan view of the same tracer.

Considering the figures, there is shown the drive mechanism of a tracer including a base 4 in which is rotatably mounted a sleeve 5. At the base of the sleeve 5 is a gear 6 having a flat face 7. Also rotatably mounted in the base 4 is a further gear 8 which is mounted on the end of a shaft 9 which is rotatably driven by the driving motor not shown. Mounted rotatably within the sleeve 5 is a shaft 10. The lower end of the shaft 10 terminates in a housing 11 which carries bearings for a shaft 12 rotatably mounted in the housing. On each end of the shaft 12 is mounted a wheel designated 13 and 14 respectively. These wheels are identical in construction and fixedly mounted to the shaft 12. The wheel 13 engages the surface 7 of the gear 6 while the wheel 14 engages the table or surface 17 in driving engagement. A bushing 15 maintains the spacing of the two bearings and is locked within housing 11 by lock screw 16. The upper end of the shaft 10 bears a toothed pulley 18, which engages a toothed belt 19. A steering motor 20 has mounted on its shaft a toothed pulley 21 which also engages the toothed belt 19. The toothed belt 19 is also shown engaging a pulley at the top of the optical sensing device 22. This device may be any suitable pattern following apparatus which will provide steering signals to the motor 20 causing the motor to rotate in such a direction as to cause the tracing apparatus 22 to trace the pattern. A typical optical sensing and signal generating apparatus is more fully disclosed in my copending application Ser. No. 497,996, filed Oct. 19, 1965. In operation it will be assumed that the tracing apparatus 22 does provide a suitable signal to motor 20 causing the motor to rotate in such direction that the tracing apparatus is caused to follow a pattern. At the same time the drive motor rotates shaft 9 causing gear 8 to rotate and since this engages gear 6, gear 6 also rotates at a constant r.p.m. As long as wheel 14 is bearing on the surface of the table 17 a component of its force on the table will be applied to wheel 13 causing it to push up against the flat surface of gear 6. This frictional engagement between wheel 13 and the surface 7 causes wheel 13 to rotate driving shaft 12 which in turn drives wheel 14. In the absence of steering, it will be seen therefore that wheel 14 rotates at a constant r.p.m. determined by the gear ratios between gear 6 and 8 and also determined by the diameter of wheel 13 and the diameter of the circle of engagement between wheel 13 and surface 7. If now the steering motor 20 is energized causing its gear 21 to rotate this drives belt 19 causing the pulley 18 to rotate thus rotating the housing 11. The rotation of housing 11 effectively steers wheel 14 causing the apparatus to follow a pattern determined by the rotational signals provided by steering motor 20.

At the same time it will be seen that these steering rotations are not applied to wheel 14 in such a way as to cause changes in velocity. This may be understood if it is assumed for example that gear 6 is rotating in a clockwise direction viewed from the top as shown in FIGURE 2.

Figure 1:
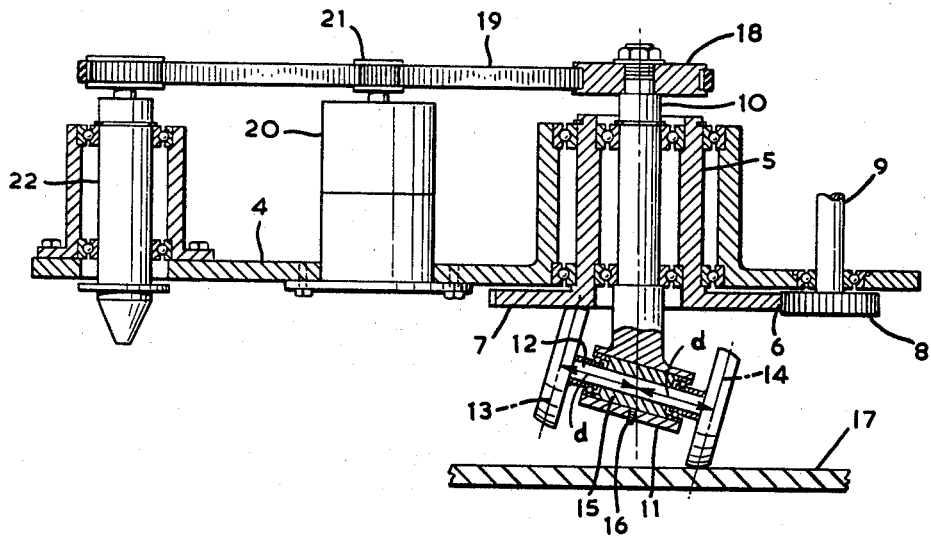
FIGURE 1 is an elevational view of a tracer in accordance with my invention.

Let us now introduce a steering signal to pulley 18 in the same direction. The reduction in speed of rotation of wheel 13 caused by rotation of shaft 10 will be exactly counterbalanced by the translation given wheel 14 by such rotation. It is assumed, of course, that wheels 13 and 14 are exactly equivalent to each other and the distances from the centre line of wheel 13 to the centre of rotation of housing 11 is exactly equal to the distance from the centre line of wheel 14 to the centre of rotation, of the housing 11. That is the distances designated $d$ in FIGURE 1 are equal. This will also be clear when it is recognized that by locking shaft 9 thus holding gear 6 stationary, pulley 16 may be rotated without causing any translation of the centre line of shaft 10.

Not only does this arrangement provide elimination of the variations in velocity which would be caused by steering, it also prevents any reaction torques from entering the steering system from the drive system and there is no torque applied to pulley 18 because of the rotation of gear 6 other than such torques as may be produced by frictional resistance. It will also be noted that the wheels 13 and 14 have curved bearing surfaces where they bear on flat surface 7 and table surface 17. These surfaces are sections of a sphere so that they maintain an essential point contact.

As previously indicated the distances $d$ must be equal. Adjustment of distances $d$ may be accomplished as follows:

Lock gear 6, replace surface 17 with a disc rotatable about the centre line of shaft 10 and drive the shaft 10. If the disc rotates, the distances $d$ are unequal. Slacken the set screw 16 and move the wheels sideways until the disc no longer rotates. Retighten the set screw.

In the preceding description it has been stated that wheels 13 and 14 are identical and the distances $d$ are equal. In fact, while this is the simplest mode of construction, variations are possible. If it is advantageous that the wheels should not be the same size or if due to wear or inadvertence they are not the same size, the differences in diameter can be compensated for by an adjustment of the distances $d$. The adjustment referred to previously will ensure the proper positioning even if the wheels are different sizes. It will be noted that the necessary relationship is that the product of the radius of the circle of the point of contact of wheel 13 on surface 7 about the axis of shaft 10 times the diameter of wheel 14 is equal to the product of the radius of the circle of the point of contact of wheel 14 and surface 17 about the axis of shaft 10 times the diameter of wheel 13.

Certain wheel diameters and adjustments will be rejected as unsuitable by those skilled in the art but the foregoing relationship will be found to be generally true. It will also be found by analysis that the velocity of the drive, assuming a constant r.p.m. on shaft 9 and a fixed gear ratio between gears 8 and 6, is a function of the diameter of the circle of the point of contact between wheel 14 and surface 17 about the axis of shaft 10. That is the velocity of the point of contact of wheel 14 on surface 17 is:

$$V = r \, (l \cos \phi - d/2 \sin \phi)$$

where:

$V$ is the velocity of the point of contact,
$r$ is the rotational speed of gear 6 in radians,
$l$ is the length of shaft 12 from the centre plane of wheel 14 to the axis of shaft 10,
$d$ is the diameter of wheel 14,
$\phi$ is the angle between axis 12 and the surface 17.

The preceding relationship will be found useful in adjusting speeds. It will also be understood that this relationship is only valid when the equipment is adjusted as described earlier.

Other modifications may be made to adapt the drive to varying conditions such as changing the means of steering shaft 10 or of driving surface 7 all within the scope of this invention.

The wheels may be treated in any desired manner to adjust their coefficient of friction to improve the operation of the apparatus. One simple manner of treatment is to shot-blast the surface. The flat surface 7 may be treated in a similar manner.

The embodiments of the invention in which an exclusive property or privilege is claimed are defined as follows:

1. A friction drive for a line tracing machine comprising a steerable shaft perpendicular to a reference plane, an axle rotatably mounted at one end of said steerable shaft at a small angle to said reference plane, a pair of wheels fixed on said axle on opposite sides of said steerable shaft, a driven annular disc parallel to said reference plane surrounding said steerable shaft and concentric with the axis thereof the surface of said disc frictionally engaging a first one of said wheels, the second one of said wheels arranged to frictionally engage a driving surface parallel to said reference plane, said wheels being so dimensioned and arranged that each wheel frictionally engages only one surface and the product of the radius of the circle described by the point of contact of said disc and said first wheel about the axis of said steerable shaft times the radius of the second wheel equals the product of the radius of the circle described by the point of contact of said second wheel and said driving surface about the axis of said steerable shaft times the radius of said first wheel.

2. A friction wheel drive as claimed in claim 1 wherein the wheels are of substantially the same diameter.

3. A friction drive for a line tracing machine comprising a steerable shaft perpendicular to a reference plane, an axle mounted for rotation only about its axis at one end of said steerable shaft with its axis at a small angle to said reference plane, a pair of wheels fixed on said axle on opposite sides of said steerable shaft, an annular driven disc parallel to said reference plane surrounding said steerable shaft and concentric with the axis thereof, the surface of said disc engaging a first one of said wheels, the second one of said wheels arranged to frictionally engage a driving surface parallel to said reference plane, said wheels being so dimensioned and arranged that each wheel frictionally engages only one surface and the resultant velocity of the axis of said steerable shaft with reference to said driving surface is a function only of the radius of the circle described by the contact point between said second wheel and said driving surface about the axis of said steerable shaft and the rotational velocity of said annular disc independent of the rotational velocity of said steerable shaft.

No references cited.

C. J. HUSAR, *Primary Examiner.*